J. C. WRIGHT.
Nut-Lock.

No. 164,505. Patented June 15, 1875.

UNITED STATES PATENT OFFICE.

JOSEPH C. WRIGHT, OF MONOCACY STATION, PENNSYLVANIA.

IMPROVEMENT IN NUT-LOCKS.

Specification forming part of Letters Patent No. 164,505, dated June 15, 1875; application filed April 24, 1875.

*To all whom it may concern:*

Be it known that I, JOSEPH C. WRIGHT, of Monocacy Station, Berks county, Pennsylvania, have invented a new and Improved Nut-Lock, of which the following is a specification:

My invention consists of a notched block sliding in a washer against the nut, to hold it by the corners or broad side, the block being held against the nut by a spring, which is contrived to release the block readily to free the nut when it is to be screwed on or off. The block is fitted in a notch in the washer for operating in this manner by rabbet-joints, which are stamped out cheaply, and the spring is a kind of yoke or bow strained against the outside of the locking-block in a very simple way.

Figure 1:
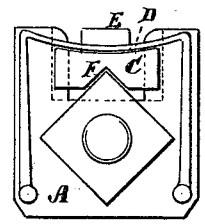
Figure 2:
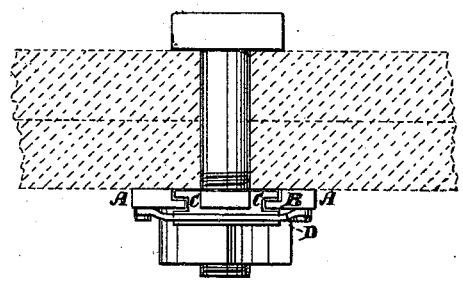

Figure 1 is a plan view of a bolt and nut with my improved lock applied, and Fig. 2 is a side elevation of the same and section of the bars bolted together.

A is the notched washer, with a rabbet-recess, B, in the under side, to confine the notched locking-block C, which is rabbeted on the upper side to fit the rabbet of the washer, and D is the yoke or bow-spring attached at the ends to the washer, and strained around the back of the block, which has a lip, E, turned above the surface of the washer to catch the spring.

The notch F of the locking-block receives the corners of the nut and holds it. It may have two or more notches to make a firm adjustment, and the nut may have six or eight corners for the same purpose.

Having thus described my invention, I claim as new and desire to secure by Letters Patent—

The combination of the sliding locking-block C and spring D with the washer and nut, substantially as specified.

JOS. C. WRIGHT.

Witnesses:
    JOS. A. RANDLE,
    NATHL. E. JANNEY.